July 23, 1968 W. B. READ 3,393,929
FLEXIBLE PIPE COUPLING
Filed Sept. 12, 1966
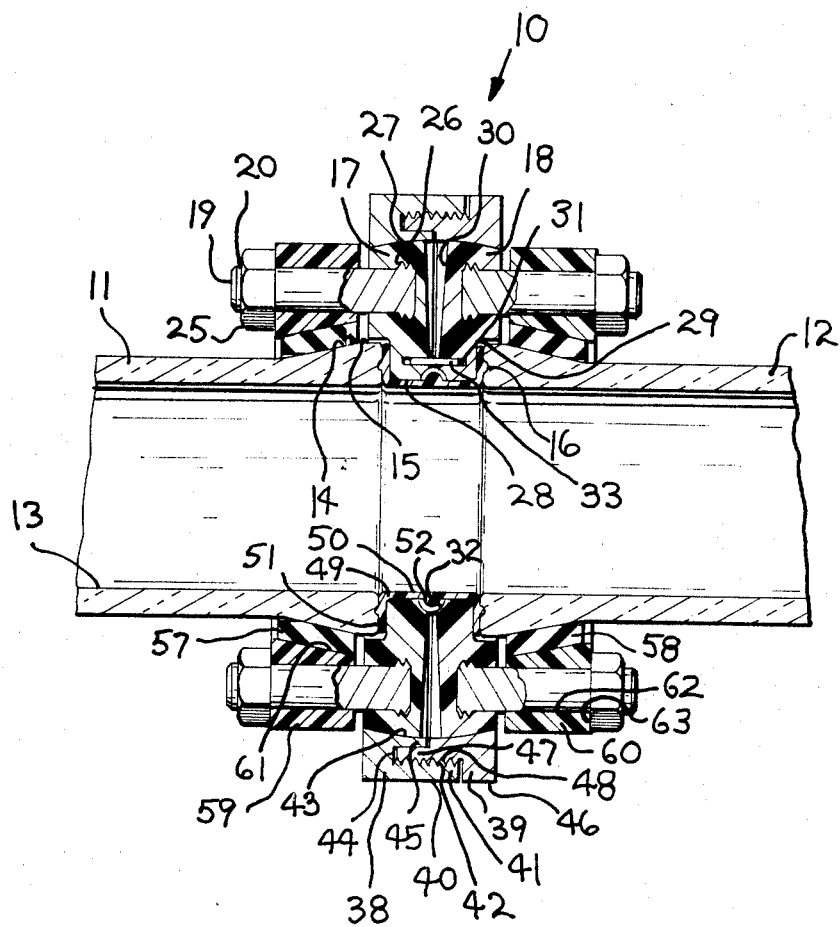
INVENTOR.
WILLIAM B. READ
BY D. R. Birchall
& W. A. Schaich
ATTORNEYS

United States Patent Office 3,393,929
Patented July 23, 1968

3,393,929
FLEXIBLE PIPE COUPLING
William B. Read, Sylvania, Ohio, assignor to Owens Illinois, Inc., a corporation of Ohio
Filed Sept. 12, 1966, Ser. No. 578,524
10 Claims. (Cl. 285—114)

This invention relates to pipe joints and, more particularly, it relates to a coupling for joining together two lengths of axially aligned lengths of pipe.

In the erection of a pipe network, particularly those that utilize glass pipe, it is desirable to reduce the overall rigidity in the system by permitting the joints to move a certain amount. The movement must be gained through the couplings since the glass pipe is by itself quite inflexible.

One of the problems heretofore associated with joints that permit movement has been that they inherently are susceptible to leaks. What the prior art gained in joint rotation or movement was at the sacrifice of capacity to withstand high internal pressures. In the prior art, movement was achieved by compressing the sealing gasket between the abutting ends of the glass pipe on the inside of the bend. The resulting compressive loads thus induced additional bending stresses in the vicinity of the joint. The increased stress level thus lowered the overall safety factor which is quite important when the volatile nature of some of the fluids carried by the glass pipes is considered. Another approach considered by the prior art was the bellows concept wherein one side of the joint contracted and the other side expanded. This concept was quite expensive and also required a bending moment to achieve any degree of movement.

An additional drawback of prior art flexible couplings was that through repeated bending or flexing of the joint, there was relative rotation of one part of the joint with respect to the remainder or other half of the joint, consequently the sealing diaphragm would be dislocated and leaks would occur.

The present invention avoids some of the inherent weaknesses that were found in the prior art in that a device is provided for coupling together glass pipe so that there will be a reduction in bending stresses induced in the glass by installation conditions. The present invention also enables higher pressure ratings to be attained and provides for the transmission of torque from one glass pipe through the coupling and into the adjacent glass pipe.

The present invention consists of a pair of stud carrying members mounted in juxtaposed relationship with their radial innermost parts positioned between the abutting ends of two axially aligned glass pipes. A Teflon sealing gasket is interdisposed between the stud carrying members and the ends of the glass pipe. The juxtaposed stud carrying members are contained within housing elements which prevent axial separation of said members yet permit a limited amount of rotation to occur. Elastomeric gaskets coupled with retaining rings provide a platform upon which nuts threaded on the studs can react to draw the two pieces of pipe towards each other. A series of circumferentially spaced apart axially aligned flexible floating torque transmitting pins are positioned so that they extend from one stud carrying member to the other.

The primary object of the present invention is to reduce the bending forces on a glass pipe system because of poor alignment during installation and because of movement occurring after installation.

An additional object of the present invention is to provide a joint between two pieces of pipe that will permit the pipes to deviate from their common straight line axis without leakage occurring from a pressurized fluid within.

Another object of the invention is to provide a pipe coupling that will permit flexing of the joint and remain in a sealed condition under a negative or positive pressure from within.

A further object of the instant invention is to provide a glass pipe joint that will provide flexibility and simultaneously transmit a torque in a positive manner from one side of the coupling to the other side.

An additional object of this invention is to provide a pipe coupling design that is simple, efficient, economical and requires a minimum of time for installation.

Another object of the present invention is to provide a pipe coupling that can withstand relatively high temperatures and can also withstand the corrosive action of the fluids carried therethrough.

Other objects and advantages of the present invention will be immediately apparent when reference is made to the following specification and claims when considered in conjunction with the accompanying drawing wherein the single view is a cross-sectional view taken longitudinally through the glass pipes as well as the flexible coupling.

Referring to the drawing, the coupling assembly is shown generally at 10. A glass pipe 11 is shown in juxtaposed relationship with an other pipe 12 of equal diameter. Pipes 11 and 12 have a smooth cylindrical interior surface 13 that permits the unimpeded flow of a fluid therethrough. The ends of pipes 11 and 12 are reinforced by extra thickness of glass, consequently they extend to a greater radial extent than does the remainder of the pipe exterior. A frusto-conical surface 14 defines the radial outward growth of pipe 11 as the end thereof is approached. However, the end of the pipe can assume an outwardly extending bulbous end typical of glass pipe sections. The most radial portion of the bulbous end of pipe 11 is of cylindrical configuration as shown at 15, however, this surface could equally well be of other configuration such as an extension of frusto-conical surface 14. Cylindrical surface 15 could also be rounded so that it would be radiused in cross-sectional configuration. The end of pipe 11 is essentially flat in that it falls on a plane normal to the longitudinal axis of the pipe. Contained within the end of pipe 11 is a groove 16 extending axially into the mass of glass that forms the bulbous end. Groove 16 is concentrically positioned with respect to the longitudinal axis of pipe 11. Since the ends of pipes 11 and 12 are for all purposes identical, only the end of pipe 11 has been described.

Positioned between the spaced apart ends of pipes 11 and 12 are stud carrying members 17 and 18. Members 17 and 18 are circular in configuration and contain a series of circumferentially spaced apart studs 19 that are in parallel alignment with one another. Studs 19 are threaded at their exterior end at 20 so that they may accommodate coacting nuts 25. The ends of studs 19 opposite the threaded ends contain an enlargement or series of enlargements as shown at 26. Since stud carrying members 17 and 18 are ideally fabricated from a molded plastic material such as a thermosetting phenolic, enlargements 26 on the ends of studs 19 prevent their extrication when an axial load is applied thereto. Stud carrying members 17 and 18 are of identical configuration and are positioned back to back as shown in the drawing. It will be realized that bolts can replace studs 19 and could be installed in tapped holes in members 17 and 18. Using member 17 as a typical stud carrying member, the outer circumferential surface 27 has a spherical contour in the direction of the longitudinal axis of the coupling. The radially inward edge 28 of member 17 is cylindrical and has a radius somewhat larger than the internal radius of the glass pipes 11 and 12. The side of member 17 that contains studs 19 protruding therefrom contains cylindrical-shaped notch 29 that provides room for the end of the glass pipe and the flange of the Teflon sealing gasket 49.

The side 30 of member 17 opposite the side from which studs 19 protrude appears to be tapered with respect to a plane that is normal to the longitudinal axis of the coupling, however, side surface 30 is actually frusto-conical in configuration. This configuration provides for a line contact between members 17 and 18 when the joint has undergone its maximum rotation. Located toward the radially inward section of frusto-conical side surface 30 are a plurality of circumferentially spaced holes or apertures 31. Holes 31 are cylindrical in configuration and extend into but not entirely through the longitudinal extent or thickness of member 17. Holes 31 are parallel to each other and are also parallel to the longitudinal axis of the coupling. The radially innermost corner 32 of side surface 30 of member 17 is beveled or rounded as shown in the drawings for clearance purposes.

Contained within holes 31 are pins 33. Pins 33 are of cylindrical configuration and are constructed from a flexible material such as steel. Pins 3 are of shorter length than the combined extent of both holes 31 into which it extends. In this manner the pin 33 can float back and forth as the pipe joint undergoes angular movement.

Stud carrying members 17 and 18 are held in juxtaposed position by external clamp rings 38 and 39. Clamp ring 38 contains a cylindrical exterior surface 39 of generally cylindrical configuration, however other geometric shapes such as hexagonal or octagonal surfaces may be employed for wrenching purposes. Clamp ring 38 contains an axially extending flange 41 that is threaded on the interior cylindrical surface thereof with threads 42. The radially innermost surface 43 of clamp ring 38 is spherical in configuration with the curvature symmetrically aligned about the longitudinal axis of the clamp ring. A concentrically positioned groove 44 is interdisposed in clamp ring 38 between the inner flange 45. Groove 44 provides room for mating clamp ring 39 as will be pointed out infra. Clamp ring 39 contains an exterior surface 46 that is similar in configuration and radial extent to surface 40 of clamp ring 38. An axially extending flange 47 is cantilevered from the body portion of clamp ring 39. Flange 47 is positioned radially and is threaded exteriorly at 48 so that it can engage the threads 42 on clamp ring 38. The radially inner surface of clamp ring 39 is of sperical configuration similar to spherical surface 43 of clamp ring 38.

When clamp rings 38 and 39 are interlocked by means of their threaded engagement, they prevent stud carrying members 17 and 18 from becoming disengaged in an axial direction, however members 17 and 18, by virtue of their spherical exteriors, can pivot within the confinement of clamp rings 38 and 39.

A sealing gasket 49 is positioned between the stud carrying members 17 and 18 and the flanged ends of glass pipe sections 11 and 12. Gasket 49 has a cylindrical interior surface 50 that is essentially the same diameter as interior surface 13 of glass pipe sections 11 and 12. Gasket 49 contains on either end of its cylindrical section a radially extending flange 51 arranged so that it is normal to the axis of the joint. Flanges 51 are compressed between the end surfaces of the flanges on glass pipes 11 and 12 and against the rentrant corner or notches 29 on stud carrying members 17 and 18. Toward the center of the cylindrical section of gasket 49 is thickened reinforcement ring 52. Ring 52 provides rigidity to gasket 49 when its internal surface is under the influence of a negative internal pressure. As shown in the drawing, gasket 49 which is made from a material such as Teflon will flow into grooves 16 in the ends of glass pipes 11 and 12 thus sealing and positioning the gasket 49.

Cushioning washers 57 and 58 are placed on the back side of the flanges of glass pipes 11 and 12. Cushion washers 57 and 58 can be, if desired, made from an elastomeric material such as rubber, however additional materials such as asbestos or a ductile metal such as lead could be used.

Radially outward from cushion washers 57 and 58 are flange bearing members 59 and 60. Flange bearing members 59 and 60 are similar to one another and contain a beveled or frusto-conical surface 61 located on their radially inward surfaces. Surface 61 corresponds generally with the sloped exterior surface as shown on washers 57 and 58. The flange bearing members 59 and 60 contain a series of circumferentially spaced apertures 62 through which studs 19 can pass. The outermost surface 63 on flange bearing members 59 and 60 provides a working surface upon which nuts 25 can react as they are threaded on studs 19.

During the assembly of a typical glass pipe to glass pipe joint, washers 57 and 58 are positioned around the exteriors of glass pipes 11 and 12. The washers are fitted on the back side of the enlarged flanged ends of the glass pipe. Stud carrying members 17 and 18 are positioned so that their frusto-conical surfaces are back to back with pins 33 positioned in holes or apertures 31. Gasket 49 is positioned over the radially inward edges of stud carrying members 17 and 18. Clamp rings 38 and 39 are placed over the spherical surfaces 27 of members 17 and 18. Clamp rings 38 and 39 are then coupled together by uniting their threaded surfaces 42 and 48. The ends of the glass pipes are then placed in contact with the exterior of flanges 51 of gasket 49. Flange bearing members 59 and 60, which have previously been positioned over the ends of the glass pipes, are brought toward the joint and over the longitudinally protruding studs 19. The beveled surface 61 of members 59 and 60 is indexed against the outer surface of washers 57 and 58. As nuts 25 are tightened, they draw gaskets 49 tight against the grooved end of the pipe flanges thus effecting a seal capable of withstanding internal pressure either positive or negative.

The pipe joint as described above will permit one pipe coupled thereto to be angularly disposed with respect to the adjacent pipe sealingly engaged therewith. Pins 33 will move in and out of their holes or apertures as the joint assumes an angular position. Pins 33 can also undergo a slight amount of bending without exceeding their elastic limit. The pipe joint achieved by the present invention is in the form of a universal joint and does not introduce appreciable loads on the edges of the abutting pipe flanges.

An additional feature provided for in the present pipe coupling heretofore described is that pins 33 provide a means of transmitting torque from one side of the pipe joint to the other side. In this way the seal between the glass pipe ends and the sealing gasket will not be disrupted or damaged through inadvertent twisting of one or more pipe sections.

While certain representative embodiments and details have been shown for the purpose of illustrating the invention, it will be apparent to those skilled in this art that various changes and modifications may be made therein without departing from the spirit or scope of the invention.

What is claimed is:

1. In combination, a pipe coupling for joining together two axially aligned sections of flanged pipes, a first member of circular configuration with a centrally positioned axially aligned aperture therethrough, the radially outward periphery of said member having a spherical contour symmetrical with the longitudinal axis thereof, one of the sides of said member containing a plurality of circumferentially spaced attachment means anchored therein, said means positioned parallel to each other and parallel to the longitudinal axis of said member, the other side of said member having a surface with a plurality of circumferentially spaced small apertures therein, a second member of similar configuration to said first member and in juxtaposed position therewith, the surfaces of said members that contain the small apertures placed adjacent each other, pins movably positioned within the small apertures of said first member and extending into the respective apertures in said second member, interlocking flange couplers intercoupling means thereon so that they may be connected together, said flange couplers positioned radially outward from said first and second members, the inner surface of said flange couplers defining a spherically contoured seat upon which the first and second members can rotate, load dispersion cushions placed behind the bulbous ends of said pipes, flange bearing members seated on said cushions and containing a plurality of circumferentially positioned apertures through which pass said attachment means, and a sealing gasket interdisposed between the ends and in sealing engagement with the ends of said pipes and a reentrant portion of said first and second members, thus providing a sealed fluid tight pipe coupling capable of angular movement with little resulting bending moment therein.

2. In the combination for a pipe coupling as claimed in claim 1 wherein the attachment means consists of a plurality of studs threaded on one end and having an enlarged opposite end that is embedded within said first and second members, said studs coacting with a plurality of internally threaded nuts.

3. In the combination for a pipe coupling as claimed in claim 1 wherein the surfaces of said first and second members opposite the surface containing the attachment means are of frusto-conical configuration.

4. In the combination for a pipe coupling as claimed in claim 1 wherein the intercoupling means between said interlocking flange couplers consists of external threads on one part and internal threads on the other part.

5. In the combination for a pipe coupling as claimed in claim 4 wherein each of the external radial outward surfaces of said flange couplers contains a polygonal wrenching surface.

6. In the combination for a pipe coupling as claimed in claim 1 wherein said sealing gasket contains centrally located circumferentially disposed integrally attached thickened portion to prevent a collapse of said gasket when under the influence of negative internal pressure.

7. In the combination for a pipe coupling as claimed in claim 1 wherein the ends of said glass pipe flanges each contain a concentrically positioned recess into which the sealing gasket can be forced during final coupling of the pipe joint.

8. In the combination for a pipe coupling as claimed in claim 1 wherein the overall length of said pins is less than the combined depth of said small apertures in said first and second members.

9. In the combination for a pipe coupling as claimed in claim 1 wherein the surfaces of said flange bearing members that are in contact with said load dispersion cushions are frusto-conical in configuration.

10. In the combination for a pipe coupling as claimed in claim 1 wherein the circumferentially spaced attachment means are bolts with a threaded engagement into said first and second members.

References Cited

UNITED STATES PATENTS 2,688,500   9/1954   Scott _____ 285—353 X
3,212,798  10/1965   Lewis et al. _____ 285—368 X EDWARD C. ALLEN, *Primary Examiner.*

THOMAS F. CALLAGHAN, *Assistant Examiner.*